United States Patent
Matsuda et al.

(10) Patent No.: US 7,115,039 B2
(45) Date of Patent: Oct. 3, 2006

(54) CONTENTS DISTRIBUTION SYSTEM FOR SIMULATION RIDE SYSTEM, DISTRIBUTION APPARATUS FOR RIDE CONTENTS ADMINISTRATION CENTER, SIMULATION RIDE CONTROL APPARATUS AND COMPUTER SOFTWARE

(75) Inventors: Yuji Matsuda, Tachikawa (JP); Tsukasa Shiina, Yotsukaido (JP); Masayuki Oshiro, Inzai (JP); Kazuhide Ebine, Narashino (JP); Kenjiro Fujii, Yachiyo (JP); Katsumasa Nagai, Tokyo (JP)

(73) Assignees: Hitachi, Ltd., Tokyo (JP); Hitachi Keiyo Engineering Co., Ltd., Narashino (JP)

( * ) Notice: Subject to any disclaimer, the term of this patent is extended or adjusted under 35 U.S.C. 154(b) by 1119 days.

(21) Appl. No.: 09/942,610

(22) Filed: Aug. 31, 2001

(65) Prior Publication Data
US 2002/0119826 A1   Aug. 29, 2002

(30) Foreign Application Priority Data
Feb. 28, 2001   (JP)   ............................ 2001-053802

(51) Int. Cl.
*A63G 31/16*   (2006.01)
*G09B 9/08*   (2006.01)

(52) U.S. Cl. .................. 472/59; 472/61; 472/130; 434/55

(58) Field of Classification Search ............ 472/59–61, 472/130; 434/29–38, 55
See application file for complete search history.

(56) References Cited

U.S. PATENT DOCUMENTS

| | | | |
|---|---|---|---|
| 4,477,069 A | | 10/1984 | Crudgington, Jr. |
| 5,775,995 A | | 7/1998 | Okamoto |
| 5,947,825 A | | 9/1999 | Horstmann et al. |
| 6,007,338 A | | 12/1999 | DiNunzio et al. |
| 6,027,342 A | * | 2/2000 | Brown ....................... 434/55 |
| 6,077,077 A | * | 6/2000 | Geipe ......................... 434/30 |
| 6,095,926 A | * | 8/2000 | Hettema et al. .............. 472/59 |
| 6,113,500 A | | 9/2000 | Francis et al. |
| 6,431,872 B1 | * | 8/2002 | Shiraishi et al. ............. 434/69 |
| 6,431,989 B1 | * | 8/2002 | Katayama et al. ............ 472/60 |

FOREIGN PATENT DOCUMENTS

EP   0 681 297   11/1995

* cited by examiner

*Primary Examiner*—Kien Nguyen
(74) *Attorney, Agent, or Firm*—Antonelli, Terry, Stout and Kraus, LLP.

(57) ABSTRACT

A contents distribution system for a simulation ride system has a seat rocking unit, a video unit, an acoustic unit, and a simulation ride control apparatus. The simulation ride control apparatus has the simulation ride system controlling operations of the seat rocking unit, the video unit, and the acoustic unit by using content data, and a distribution apparatus for a ride contents administration center. The distribution apparatus for the ride contents administration center distributes the content data and the simulation ride control apparatus receives the distributed content data.

19 Claims, 7 Drawing Sheets

CONTENTS DISTRIBUTION SYSTEM FOR SIMULATION RIDE SYSTEM, DISTRIBUTION APPARATUS FOR RIDE CONTENTS ADMINISTRATION CENTER, SIMULATION RIDE CONTROL APPARATUS AND COMPUTER SOFTWARE

BACKGROUND OF THE INVENTION

The present invention relates to a contents distribution system for a simulation ride system, a distribution apparatus for a ride contents administration center, a simulation ride control apparatus and computer software, and more particularly to a contents distribution system for a simulation ride system having a seat rocking unit, a video unit, an acoustic unit, and a simulation ride control apparatus and comprising a simulation ride system in which the simulation ride control apparatus controls operations of the seat rocking unit, the video unit, and the acoustic unit by using content data and a distribution apparatus for a ride contents administration center.

In the entertainment industry, there are known amusement facilities having interactive game machines such as an amusement park, a theme park, and an urban theme park into which a ride attraction, a production-type attraction, a high-tech attraction, etc. are introduced.

SUMMARY OF THE INVENTION

It is an object of the present invention to provide a contents distribution system for a simulation ride system, a distribution apparatus for a ride contents administration center, a simulation ride control apparatus and computer software which enable a time reduction for a content renewal at a site.

Conventionally, simulation ride systems in these facilities have the following problems:
(1) In the site side (an operating side of a theme park, a recreation ground, etc.), contents are fixed to those introduced at a system construction, thereby decreasing an effect of attracting customers (there are few examples of customers who experience the same contents repeatedly like the movies and naturally a regular renewal of the contents is necessary at the site). As a result, further investment intentions or resources deteriorate, which disables expansion. In addition, it results in a need for much time and cost of a renewal of facilities.
(2) In the content supply side (a ride contents holder such as a ride manufacturing company or a contents production company), generally the content production costs much money (they say tens of millions yen or thousands of millions yen, though it depends on the scale), while it is hard to recover production costs unless the running site is expanded or the content use frequency is increased.
(3) In the hardware supply side (including service and maintenance: a ride manufacturing company), the simulation ride system has not been established as a business under the conditions in which the site is not expanded for the above reason (1).

In accordance with one aspect of the present invention, there is provided a contents distribution system for a simulation ride system having a seat rocking unit, a video unit, an acoustic unit, and a simulation ride control apparatus and comprising a simulation ride system in which the simulation ride control apparatus controls operations of the seat rocking unit, the video unit, and the acoustic unit by using content data and a distribution apparatus for a ride contents administration center, wherein the distribution apparatus for the ride contents administration center has a function of distributing the content data and wherein the simulation ride control apparatus has a function of receiving the distributed content data.

With these features, the content data is digitized and distributed in the contents distribution system for the simulation ride system.

Preferably, the distribution apparatus for the ride contents administration center has a function of deleting encrypted and distributed content data in the contents distribution system for the simulation ride system.

Furthermore, the simulation ride control apparatus has a function of deleting the encrypted and distributed content data in the contents distribution system for the simulation ride system.

Still further, the distribution apparatus for the ride contents administration center distributes the content data by using a satellite system or an Internet system in the contents distribution system for the simulation ride system.

Preferably, the distribution apparatus for the ride contents administration center has a function of receiving a content distribution request, a function of executing a distribution schedule based on the distribution request, and a function of charging a distribution request side at the distribution or a completion thereof in the contents distribution system for the simulation ride system.

Furthermore, the distribution apparatus for the ride contents administration center has a function of executing a distribution schedule depending on each distribution request source in the contents distribution system for the simulation ride system.

Still further, the distribution apparatus for the ride contents administration center has a function of changing an accounting control for each distribution content or distribution schedule in the contents distribution system for the simulation ride system.

Preferably, the simulation ride control apparatus converts motion data of the distributed content to an operation of a machine having a finite stroke in the contents distribution system for the simulation ride system.

Furthermore, the simulation ride control apparatus has a function of converting parameters which enable motion data incorporated in the distributed content data to be converted in accordance with an experience request of the site and a function of controlling the motion operation by using the converted parameters in the contents distribution system for the simulation ride system.

Preferably, the distribution apparatus for the ride contents administration center has a function of distributing content data incorporating parameters for converting motion data in accordance with an experience request of the site in the contents distribution system for the simulation ride system.

In accordance with another aspect of the present invention, there is provided a distribution apparatus for a ride contents administration center having a seat rocking unit, a video unit, an acoustic unit, and a simulation ride control apparatus and forming a contents distribution system for a simulation ride system together with a simulation ride system in which the simulation ride control apparatus controls operations of the seat rocking unit, the video unit, and the acoustic unit, wherein the distribution apparatus has a function of distributing the content data.

Furthermore, the content data is digitized and distributed in the distribution apparatus for the ride contents administration center.

Still further, the distribution apparatus for the ride contents administration center has a function of deleting encrypted and distributed content data.

Preferably, the distribution apparatus for the ride contents administration center distributes the content data by using a satellite system or an Internet system.

Furthermore, the distribution apparatus for the ride contents administration center has a function of receiving a content distribution request, a function of executing a distribution schedule based on the distribution request, and a function of charging a distribution request side at the distribution or a completion thereof.

Furthermore, the distribution apparatus for the ride contents administration center has a function of executing a distribution schedule depending on each distribution request source.

Still further, the distribution apparatus for the ride contents administration center has a function of changing an accounting control for each distribution content or distribution schedule.

Furthermore, the distribution apparatus for the ride contents administration center has a function of distributing content data incorporating the parameters for converting the motion data in accordance with the experience request of the site.

In accordance with still another aspect of the present invention, there is provided a simulation ride control apparatus for controlling operations of a seat rocking unit, a video unit, and an acoustic unit of a simulation ride system by using content data, wherein the control apparatus has a function of receiving distributed content data.

Preferably, the simulation ride control apparatus has a function of deleting encrypted and distributed content data.

Furthermore, the simulation ride control apparatus has a function of converting motion data of the distributed content to an operation of a machine having a finite stroke.

Still further, the simulation ride control apparatus has a function of converting parameters which enable motion data incorporated in the distributed content data to be converted in accordance with an experience request of the site and a function of controlling the motion operation by using the converted parameters.

In accordance with further aspect of the present invention, there is provided computer software for use in a distribution apparatus for a ride contents administration center forming a contents distribution system for a simulation ride system together with a simulation ride system having a seat rocking unit, a video unit, an acoustic unit, and a simulation ride control apparatus or for use in the simulation ride control apparatus for controlling operations of the seat rocking unit, the video unit, and the acoustic unit of the simulation ride system by using content data, wherein the computer software is a computer program for enabling a computer to execute a function of distributing the content data or a function of receiving distributed content data.

According to the present invention, there is provided a contents distribution system for a simulation ride system that enables a time reduction for a content renewal.

DESCRIPTION OF THE EMBODIMENTS

The preferred embodiments of the present invention will now be described.

Figure 1:
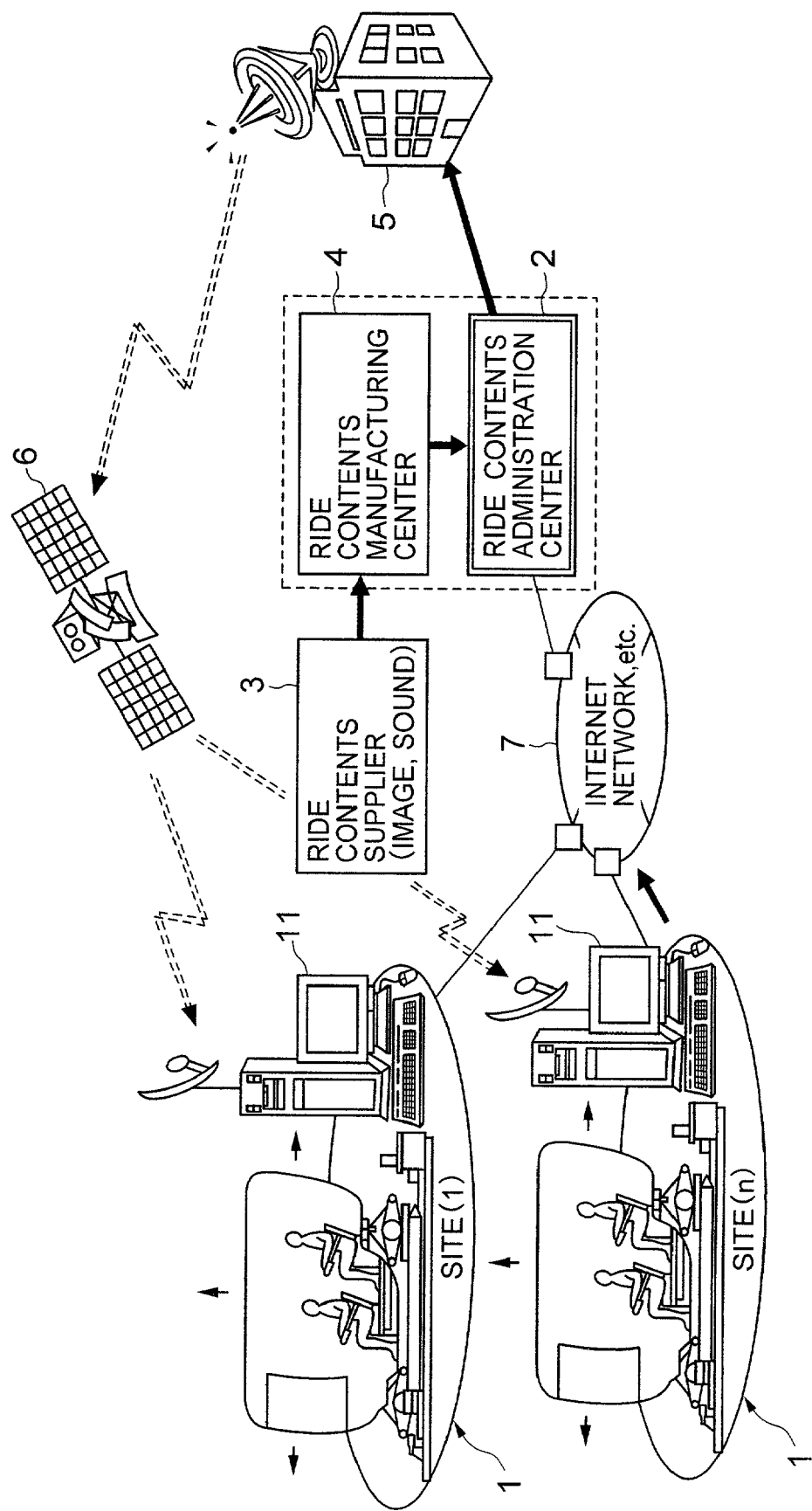
FIG. 1 is an explanatory diagram of a contents distribution system for a simulation ride system according to an embodiment.
Figure 2:
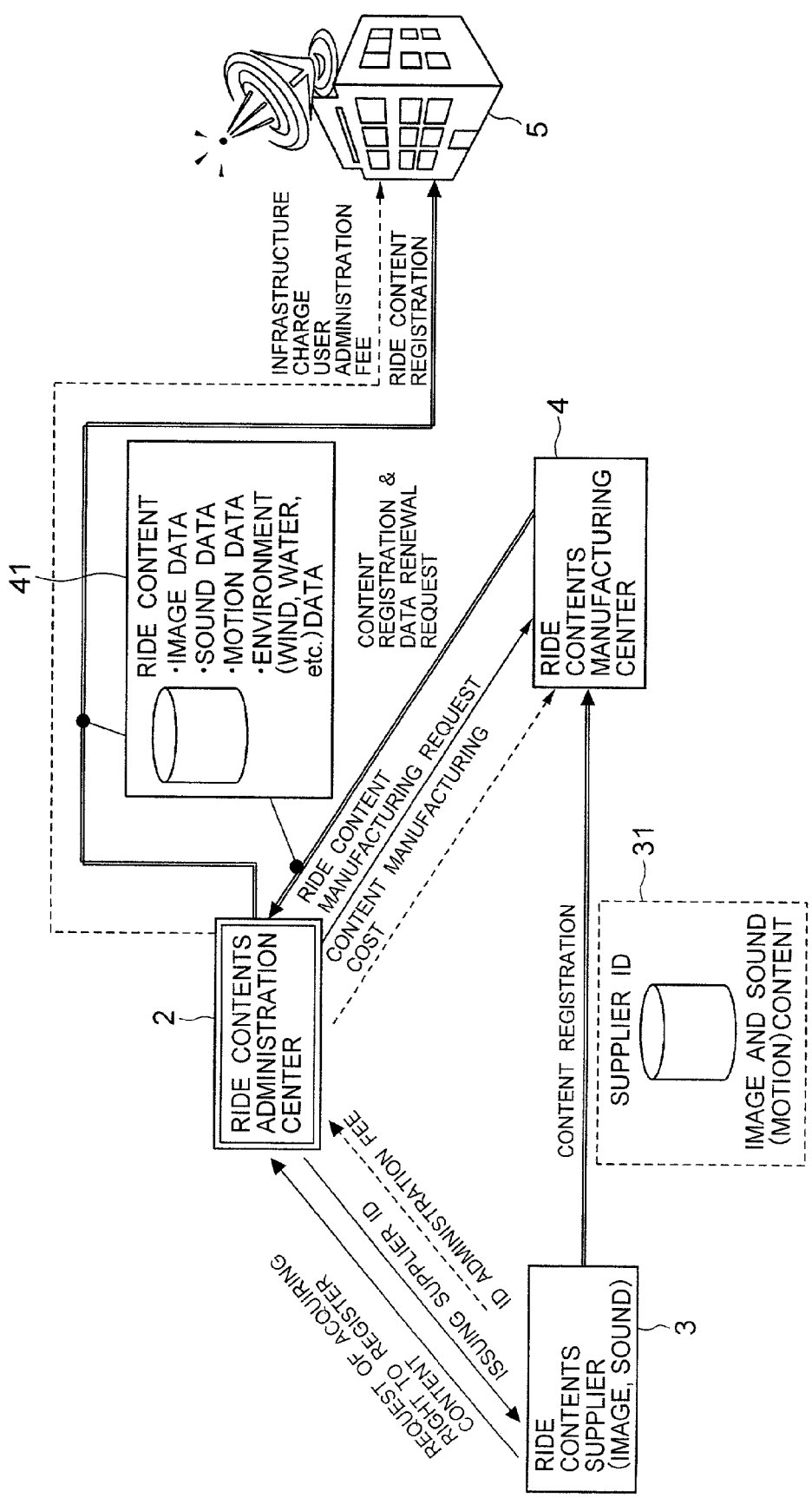
FIG. 2 is an explanatory diagram of a content registration application method according to the embodiment.
Figure 3:
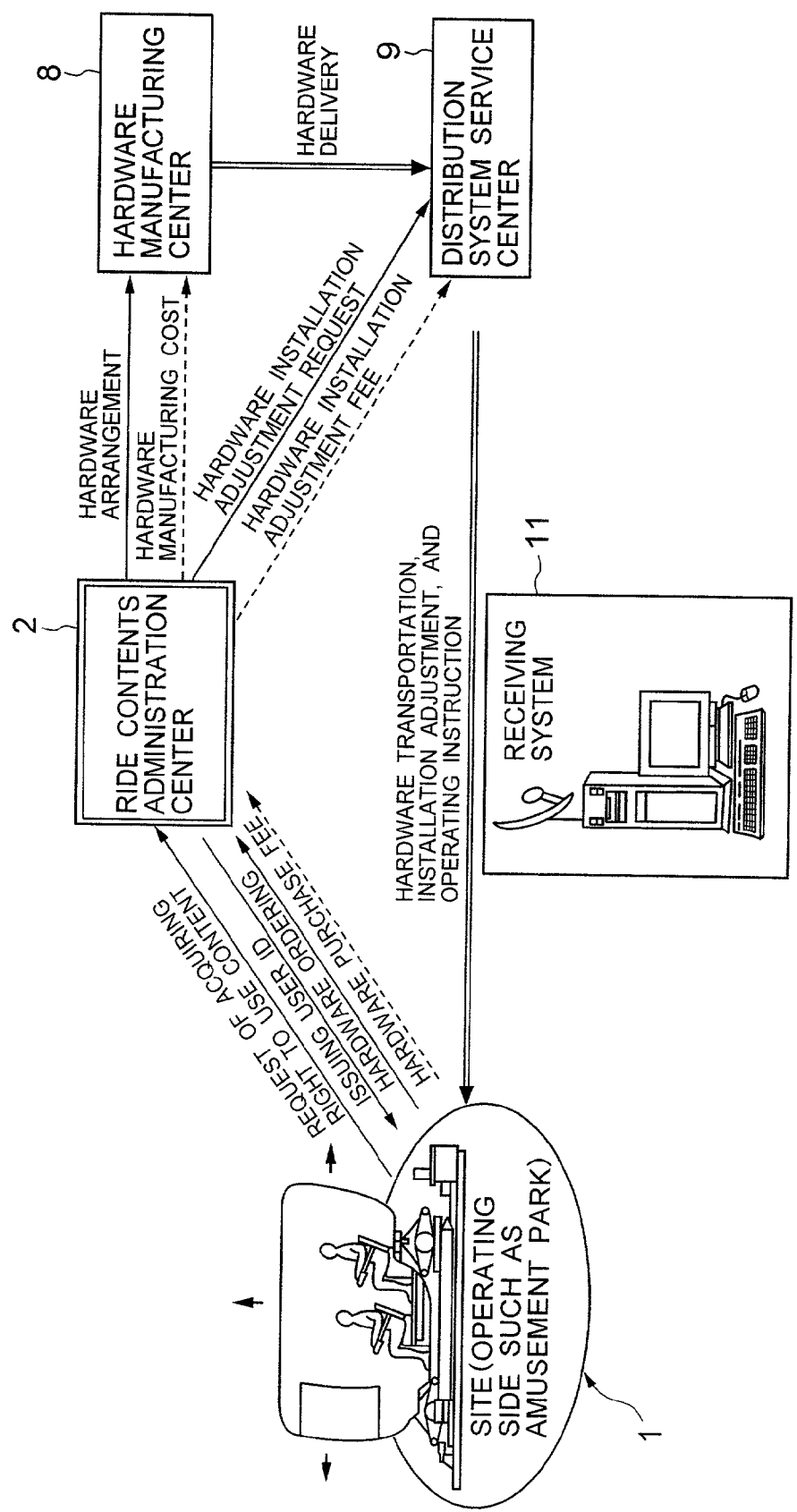
FIG. 3 is an explanatory diagram of a hardware introduction application method according to the embodiment.
Figure 4:
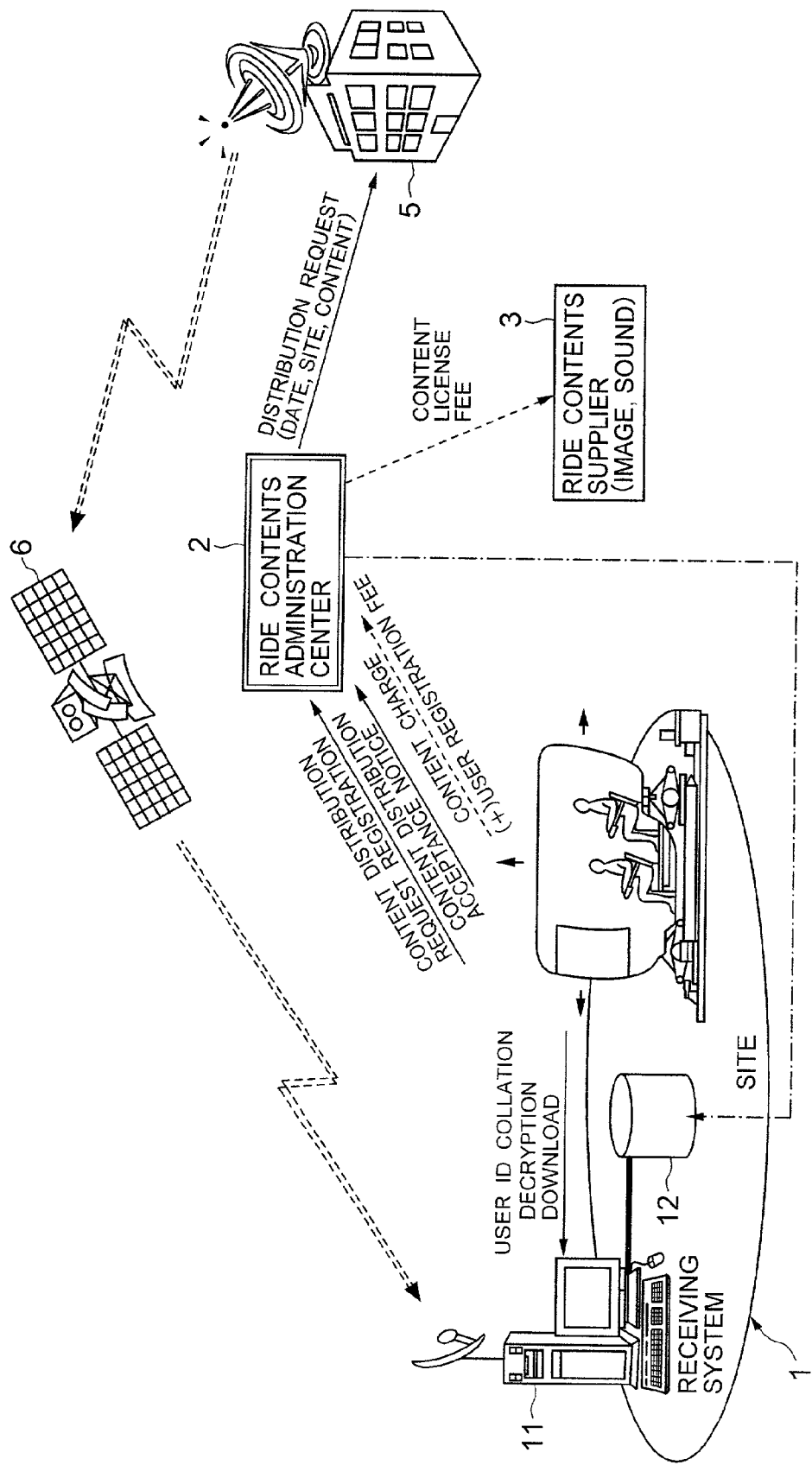
FIG. 4 is a system application method according to the embodiment.
Figure 5:
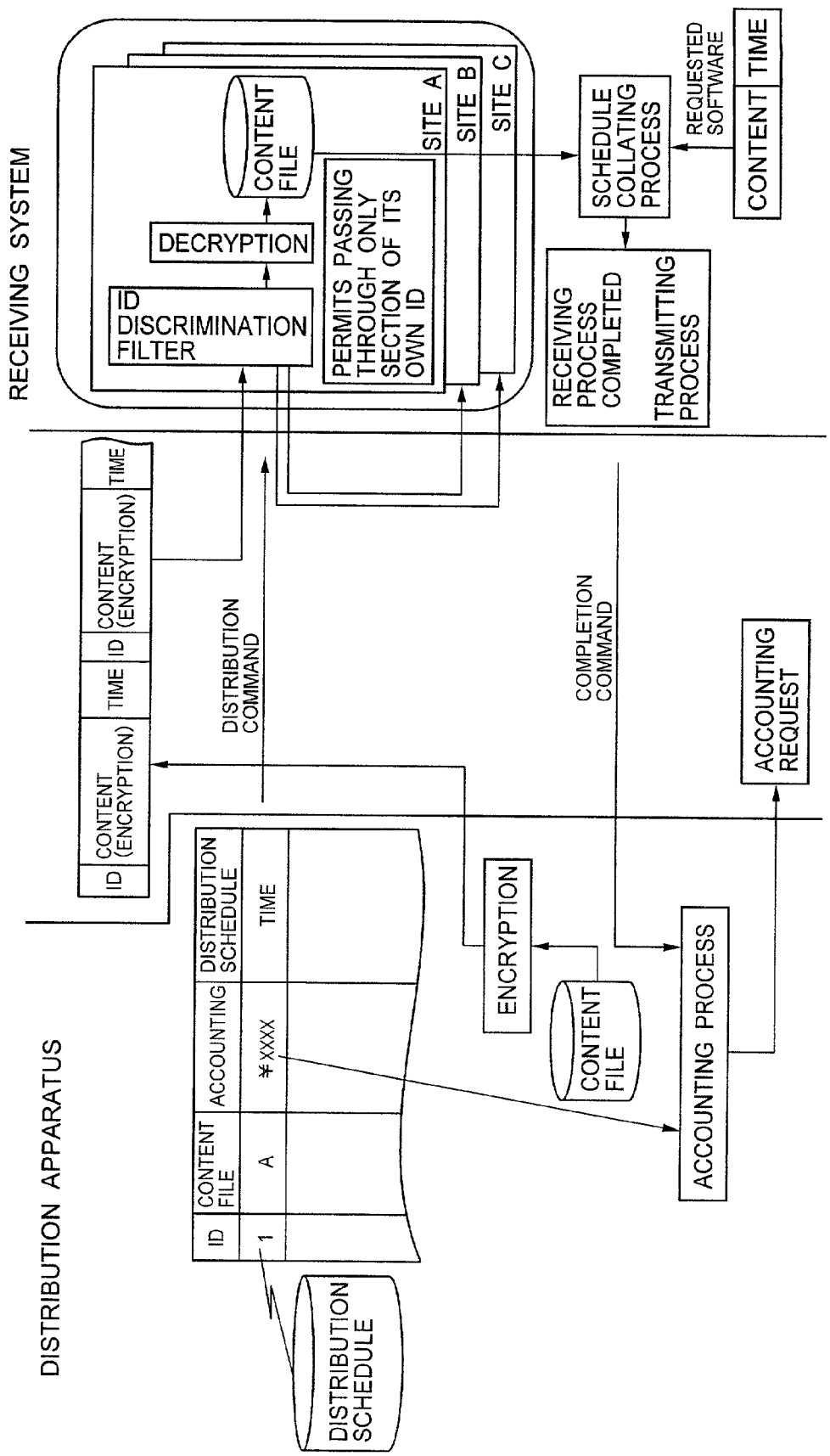
FIG. 5 is an explanatory diagram of an accounting system and a distribution schedule according to the embodiment.
Figure 6:
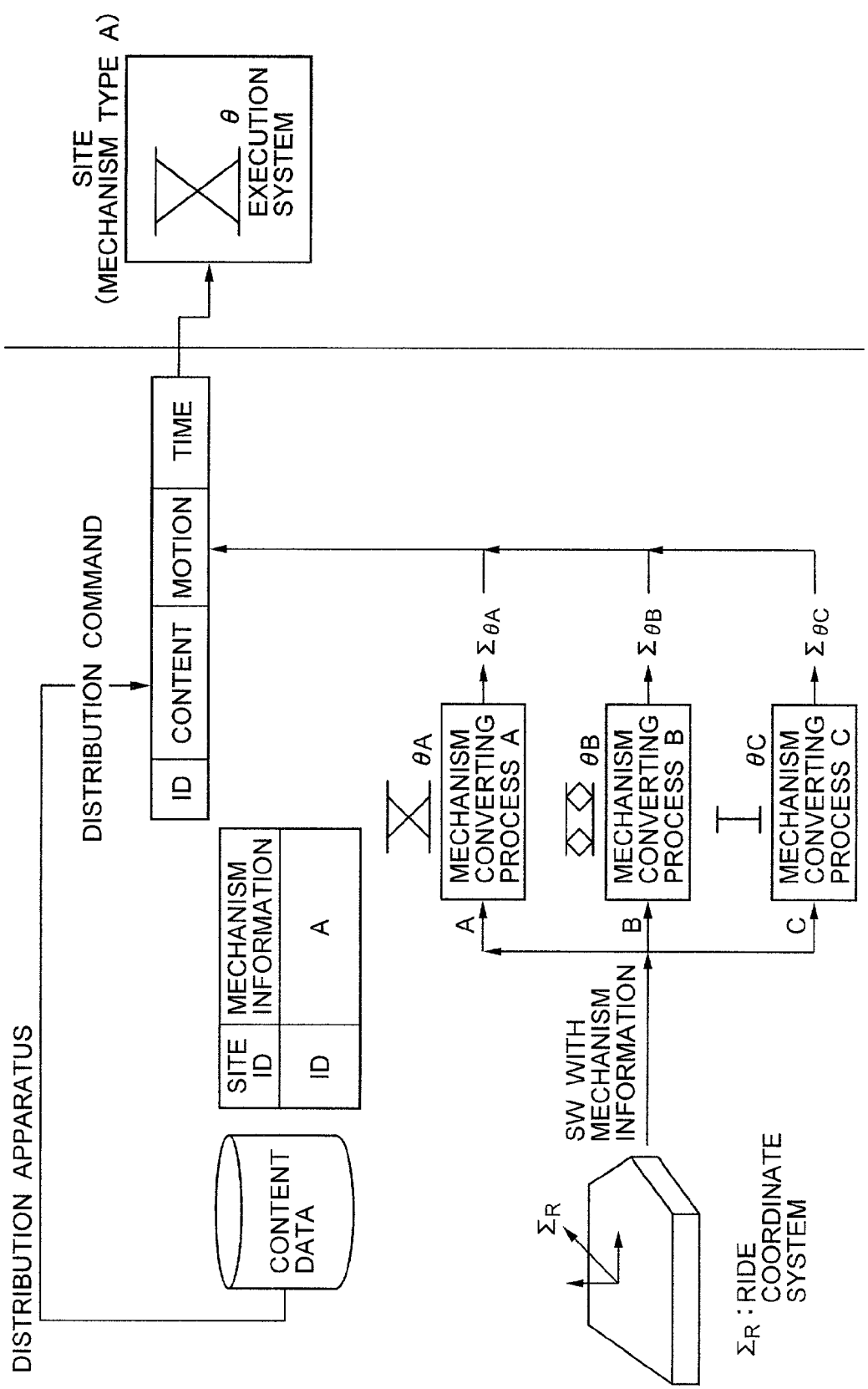
FIG. 6 is an explanatory diagram of a conversion to an operation of a machine having a finite stroke according to the embodiment.
Figure 7:
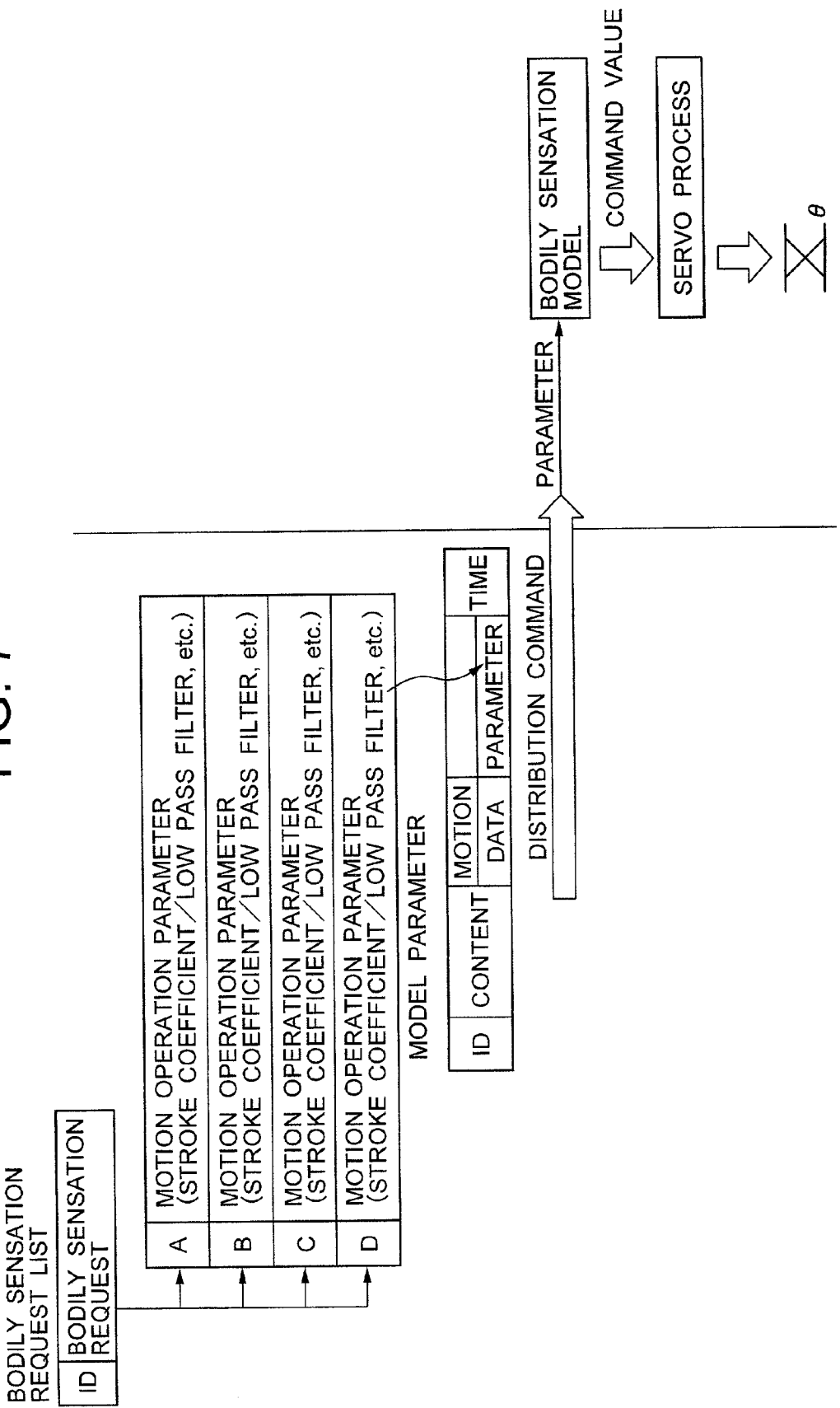
FIG. 7 is an explanatory diagram of motion operation controller using parameters according to the embodiment.

A contents distribution system for a simulation ride system, a distribution apparatus for a ride contents administration center, and a simulation ride control apparatus will be described below by using FIG. 1 to FIG. 7. Referring to FIG. 1, there is shown an explanatory diagram of the contents distribution system for the simulation ride system according to this embodiment. Referring to FIG. 2, there is shown an explanatory diagram of a contents registration application method according to the embodiment. Referring to FIG. 3, there is shown an explanatory diagram of a hardware introduction application according to the embodiment. Referring to FIG. 4, there is shown a system application method according to the embodiment. Referring to FIG. 5, there is shown an explanatory diagram of an accounting system and a distribution schedule according to the embodiment. Referring to FIG. 6, there is shown an explanatory diagram of a conversion to an operation of a machine having a finite stroke according to the embodiment. Referring to FIG. 7, there is shown an explanatory diagram of motion operation controller using parameters according to the embodiment.

The embodiment is described below. The contents distribution system for the simulation ride system according to this embodiment comprises a simulation ride system installed in site (1) to site (n) and a distribution apparatus installed in a ride contents administration center 2, as shown in FIG. 1. The simulation ride system has a seat rocking unit, a video unit, an acoustic unit, and a simulation ride control apparatus, and a site user can enjoy a simulation ride game by the seat rocking unit, the video unit (a projector, a screen, an image reproducing unit, etc.) and the acoustic unit (a speaker, an amplifier, a sound reproducing unit, etc.). The simulation ride control apparatus controls operations of the seat rocking unit, the video unit, and the acoustic unit by using content data. The site 1 issues a request of distributing the content data to the ride contents administration center 2 via an Internet network, etc. 7 by using a receiving system 11. The ride contents administration center 2 receives a supply of the content data from a ride contents supplier (image, sound) 3 which plans and produces images or sounds and a ride contents manufacturing center 4 regarding the content data whose distribution is requested from the site 1 and then provides a satellite channel administration center 5 which is a large capacity communication network administration company with the content distribution request and information such as a distribution request content or a period transmitted from each site 1. The satellite channel administration center 5 supplies content data to respective sites (1) to (n) via the communication satellite network 6 which is a large capacity infrastructure. Each site 1 receives the content data whose distribution is requested by using the receiving system 11. In this manner, the contents distribution system for the simulation ride system according to this embodiment uses the satellite system (the large capacity communication network), collects the distribution requests from the respective sites 1 each of which has the simulation ride system installed therein into the ride contents administration center 2, the contents administration center 2 issues the distribution requests to the satellite channel administration center 5, by which the satellite channel administration center 5 can distribute the content data whose distribution is requested by the respective sites 1 on the basis of the distribution requests, thereby reducing the time for a content renewal at the sites. In another distribution method, an Internet system can be used instead of the satellite system.

A description will be give for an application method of the contents distribution system for the simulation ride system according to this embodiment. First, an example of the content registration application method is described below by using FIG. 2 as follows:

(1) The contents supplier (images, sounds) 3 requests an acquisition of a right to register the content from the ride contents administration center 2 and receives an issue of the supplier ID. At this time, an ID administration fee.

(2) The supplier ID, image, and sound (motion) contents 31 owned by the contents supplier 3 are passed to the ride contents manufacturing center 4.

(3) The ride contents manufacturing center 4 receives a ride content manufacturing request and a contents manufacturing cost from the ride contents administration center 2 and converts the contents 31 received from the ride contents supplier to ride contents (digitized data including image data, sound data, motion data, and environment data such as wind or water) 41.

(4) The ride contents manufacturing center 4 requests the ride contents administration center 2 to register the converted ride contents 41 or to update data.

(5) The ride contents administration center 2 updates a content distribution Web and the administration data and registers the ride contents 41 at the satellite channel administration center (a large capacity infrastructure administration company) 5. In this manner, the content registration can be applied.

Next, an example of the hardware introduction application according to this embodiment is described by using FIG. 3 as follows:

(1) The site (an operating site such as an amusement park) requests an acquisition of a right to use the content from the ride contents administration center 2 and receives an issue of a user ID. The site 1 which has acquired the right to use the content issues a request to the ride contents administration center 2 for placing an order of a receiving system (hardware in the client side) 11 and pays for purchasing the hardware.

(2) The ride contents administration center 2 arranges for the hardware by requesting the hardware manufacturing center 8 to manufacture it and pays for the hardware manufacturing and requests the distribution system service center 9 to adjust installation of the receiving system 11 and pays for the hardware installation adjustment.

(3) The distribution system service center 9 brings the hardware (receiving system) 11 delivered from the hardware manufacturing center 8 into the site 1 and performs an installation work and gives operating instructions. In this manner, the hardware (receiving system) introduction can be applied.

A description is given below by using FIG. 4 regarding a system application method of the contents distribution system for the simulation ride system according to this embodiment as follows:

(1) The site 1 registers distribution requests such as a distributed content, distribution time, and a period of the content use at the ride contents administration center 2 on a distribution request input screen (connected through a communication line; generally an Web screen) managed by a user ID.

(2) The ride contents administration center 2 requests the distribution of the satellite channel administration center (a large capacity communication network administration company) 5 and passes the distribution date, the site, and the ride content to be distributed to the center 5 and then the satellite channel administration center 5 distributes the ride content at the distribution date via the communication satellite network 6.

(3) The site 1 operates the receiving system 11 at the distribution date without fail and executes the receiving process of the ride content. After the reception, the content registration acknowledgement is requested from the receiving system 11 and therefore a receiving completion notice is returned to the ride contents administration center 2 (by using a communication or a mail).

(4) The ride contents administration center 2 accepts a payment of a content charge (infrastructure charge +content license fee) from the site conforming to the contract content after accepting the acknowledgement notice and pays the content license fee to the ride contents supplier 3.

(5) Unless the processes in the above (3) and (4) are completed after the distribution date or if the contract period is matured, the contents administration center 2 automatically instructs the satellite channel distribution center 5 to activate a content execution stop function, thereby automatically disabling the execution of the content. It is also possible to cause the content data downloaded to the site system to be automatically erased. In this manner, the content distribution can be performed to enable a time reduction for a content renewal and the distributed content data can be deleted unless the site pays charges such as a content charge or the like.

An example of the schedule distribution and the accounting process according to this embodiment will be described by using FIG. 5 as follows:

(1) The distribution apparatus for the ride contents administration center generates a list of IDs, content files, charges, distribution schedules, etc. and encrypts the contents of the content files.

(2) The IDs, the encrypted content, the time and the like addressed to a plurality of sites are distributed together to respective sites A, B, C, - - - with a distribution command.

(3) The receiving system for each site selects and permits passing through only sections corresponding to an ID of its own site by using an ID discrimination filter among the received data, restores the content to the original data by downloading and decryption, and stores it into the content file.

(4) The content stored in the content file is collated for schedule with the content and time of the requested software. If they match, the receiving process is completed and a completion command is transmitted to the ride contents administration center.

(5) The ride contents administration center receives a completion command from the site, performs an accounting process on the basis of the accounting data on the list, and requests the charge. In this manner, the schedule distribution and the accounting process can be executed.

A description will be given below by using FIG. 6 regarding an example of converting the motion data of the distributed content to an operation of a machine having a finite stroke according to this embodiment. The distribution apparatus distributes data comprising an ID, a content, a motion, and time with a distribution command. The distributed content comprises a site ID, mechanism information, etc. in the content data. The distributed motion is submitted to mechanism converting process A, B, or C by SW with the mechanism information regarding the ride coordinate system $\Sigma_R$, thereby achieving $\Sigma_{\theta A}$, $\Sigma_{\theta B}$, and $\Sigma_{\theta C}$, respectively. The data of the ID, contents, motion, and time correspond to a mechanism type at the site, by which the machine having the finite stroke installed at the site can perform operations suitable for the content. In addition, for a different mechanism type, the motion data can be easily converted to one corresponding to each mechanism by using a mechanism conversion module (software module). Thus, the motion data of the distributed content can be converted to an operation of a machine having a finite stroke.

A description will be given below by using FIG. 7 regarding a function of converting parameters which enable motion data incorporated in the distributed content data to be converted in accordance with an experience request of the site and a function of controlling the motion operation by using the converted parameters according to this embodiment. The ride contents administration center has a bodily sensation request list, by which site IDs and experience requests are preset. Bodily sensation requests are, for example, motion operation parameters (stroke coefficient/low pass filter, etc.) A to D and a motion comprising motion data and motion parameters is preset as distributed data in addition to the ID, content, and time. When it is received at the site, a command value is determined on the basis of a bodily sensation model by the parameter, thereby enabling an experience of a site-original simulation by a servo process. This makes it possible to easily control the strength of the motion according to a difference in a class of customers or customers' requests at each site. For a site whose customers are mainly youth, impactful parameters are transmitted. For a site whose customers are mainly school children or the elderly, soft parameters can be transmitted. Thus, the motion data incorporated in the content data can be converted according to an experience request of each site. In addition, the conversion based on the experience request of the site can also be performed by using the distribution apparatus for the ride contents administration center to distribute the converted content data instead of using the simulation ride control apparatus of the site.

As set forth in the embodiments, the effects of this system are as follows:

(1) In the site side, a regular (event or the like included) content renewal is enabled, thereby improving an ability to pull in more customers. Additionally, the time for renewal can be reduced, thereby decreasing the downtime.

(2) In the content supply side, the content can be multiplied by N for the above reason described in (1), by which it is easy to recover the manufacturing cost.

(3) In the hardware supply side, a site expansion and a renewal can be expected, thereby facilitating recovering the cost with hardware. It may also lead to an expansion of the maintenance or service industry.

(4) A new ASP is constructed regarding distributions as a new business model, thereby enabling a construction of a business model for practical use (for example, administration works like those of a provider in the distribution system (collecting requests from the site side, a work for requesting the distribution side, etc.), an accounting work at distribution, etc.).

While there have been described the contents distribution system for the simulation ride system, the distribution apparatus for the ride contents administration center, and the simulation ride control apparatus in the above embodiments, it is also possible to use a program for enabling a computer to execute the function of distributing the content data or the function of receiving the distributed content data or a computer-readable recording medium (for example, a CD-ROM) in which the program is stored, so as to use the computer as a distribution apparatus for a ride contents administration center forming a contents distribution system for a simulation ride system together with a simulation ride system having a seat rocking unit, a video unit, an acoustic unit, and a simulation ride control apparatus or as a simulation ride control apparatus for controlling operations of the seat rocking unit, the video unit, and the acoustic unit by using content data.

What is claimed is:

1. A content distribution system for a simulation ride system comprising:
   a seat rocking unit;
   a video unit;
   an acoustic unit; and
   a simulation ride control apparatus comprising a simulation ride system for controlling movement of said seat rocking unit, said video unit, and said acoustic unit by content data and a distribution apparatus for a ride content administration center,
   wherein said distribution apparatus for said ride content administration center has functions of processing content data defined to include video data reproduced by said video unit, acoustic data reproduced by said acoustic unit and motion data reproducing said seat rocking unit by said simulation ride control apparatus, encrypting and storing said content data, and distributing said content data in accordance with requests from distributed parties, and
   wherein said simulation ride control apparatus has a function of receiving said distributed content data.

2. The content distribution system according to claim 1, wherein said content data is digitally encrypted and distributed.

3. The content distribution system according to claim 1, wherein said distribution apparatus for the ride contents administration center has a function of deleting encrypted and distributed content data.

4. The content distribution system according to claim 1, wherein said simulation ride control apparatus has a function of deleting encrypted and distributed content data.

5. The content distribution system according to claim 1, wherein said distribution apparatus for the ride contents administration center distributes the content data using a satellite system or an internet network.

6. The content distribution system according to claim 5, wherein said distribution apparatus for the ride contents administration center has a function of executing a distribution schedule depending on each distribution request source.

7. The content distribution system according to claim 5, wherein said distribution apparatus for the ride contents administration center has a function of changing an accounting control for each distribution content or distribution schedule.

8. The content distribution system according to claim 1, wherein said distribution apparatus for the ride contents administration center has a function of receiving a content distribution request, a function of executing a distribution schedule based on the distribution request, and a function of charging a distribution request side at the distribution or a completion thereof.

9. The content distribution system according to claim 1, wherein said simulation ride control apparatus converts motion data of the distributed content to an operation of a machine having a finite stroke.

10. The content distribution system according to claim 1, wherein said simulation ride control apparatus has a function of converting parameters which enable motion data incorporated in the distributed content data to be converted in accordance with an experience request of the site and a function of controlling the motion operation by using the converted parameters.

11. The content distribution system according to claim 1, wherein said distribution apparatus for the ride contents administration center has a function of distributing content data incorporating parameters for converting motion data in accordance with an experience request of the site.

12. A distribution apparatus for a ride content administration center comprising:
    a seat rocking unit;
    a video unit;
    an acoustic unit; and
    a simulation ride control apparatus forming a distribution system for a simulation ride system together with a simulation ride system for controlling movement of said seat rocking unit, said video unit, and said acoustic unit,
    wherein the distribution apparatus has functions of processing content data defined to include video data reproduced by said video unit, acoustic data reproduced by said acoustic unit and motion data reproducing said seat rocking unit by said simulation ride control apparatus, encrypting and storing said content data, and distributing said content data in accordance with requests from distributed parties.

13. The apparatus according to claim 12, wherein said content data is digitally encrypted and distributed.

14. The apparatus according to claim 12, further having a function of deleting encrypted and distributed content data.

15. The apparatus according to claim 12, wherein said content data is distributed by using a satellite system or an internet network.

16. The apparatus according to claim 12, further having a function of receiving a content distribution request, a function of executing a distribution schedule based on the distribution request, and a function of charging a distribution request side at the distribution or a completion thereof.

17. The apparatus according to claim 16, further having a function of executing a distribution schedule depending on each distribution request source.

18. The apparatus according to claim 16, further having a function of changing an accounting control for each distribution content or distribution schedule.

19. The apparatus according to claim 12, further having a function of distributing content data incorporating the parameters for converting the motion data in accordance with the experience request of the site.

* * * * *